United States Patent [19]

Werth, Jr.

[11] 4,432,259

[45] Feb. 21, 1984

[54] REMOTE CONTROLLED TOOL ARM ADJUSTMENT

[75] Inventor: Carl H. Werth, Jr., Bridgeport, Mich.

[73] Assignee: Werth Engineering, Inc., Bridgeport, Mich.

[21] Appl. No.: 283,026

[22] Filed: Jul. 13, 1981

[51] Int. Cl.³ .............................................. B23B 3/26
[52] U.S. Cl. ...................................... 82/2 E; 82/24 R; 82/36 R; 408/154; 408/158; 408/181; 408/714
[58] Field of Search .................... 82/36 R, 24 R, 24 A, 82/2 E, 1.2, 1.3; 408/154, 155, 156, 157, 158, 714, 181; 74/110, 128, 424.8 B

[56] References Cited

U.S. PATENT DOCUMENTS

| | | | |
|---|---|---|---|
| 2,583,477 | 1/1952 | Durler | 82/2 E |
| 2,905,028 | 9/1959 | Massari | 82/1.2 |
| 3,749,508 | 7/1973 | Schukrafft | 408/156 |
| 4,350,054 | 9/1982 | Werth | 74/128 |
| 4,351,207 | 9/1982 | Werth | 82/1.2 |

FOREIGN PATENT DOCUMENTS

| | | | |
|---|---|---|---|
| 873680 | 7/1961 | United Kingdom | 74/424.8 B |
| 808212 | 5/1981 | U.S.S.R. | 82/36 R |

Primary Examiner—Z. R. Bilinsky
Assistant Examiner—Thomas M. Kline
Attorney, Agent, or Firm—Learman & McCulloch

[57] ABSTRACT

A tool positioning device for radially adjusting, by remote control, the position of a cutting tool very precisely relative to the axis of rotation of a rotating face plate includes an air pressure operated bi-directional pawl and ratchet mechanism employed to operate a differential screw to shift a tool carrying member radially of the face plate.

8 Claims, 4 Drawing Figures

REMOTE CONTROLLED TOOL ARM ADJUSTMENT

BACKGROUND OF THE INVENTION

The present invention relates to tool arm assemblies of the general type disclosed in U.S. Pat. Nos. 3,190,152; 3,812,747; and 3,232,153, and is particularly concerned with the positioning of a tool, such as a rotary cutting tool, radially of its axis of rotation with a high degree of precision from a remote control station while the tool is being driven in rotation. The present invention provides an apparatus which can accurately adjust the position of such a tool in step-by-step increments of 0.00005 inches or less. The application is a continuation in part of my prior pending applications, Ser. Nos. 135,497 and 193,431 which are incorporated herein for any necessary purpose by reference.

SUMMARY OF THE INVENTION

In accordance with the present invention, a tool arm or carrier is mounted on the central portion of a deformable resilient steel member. Near each end of the member, a pair of transversely extending parallel slots are cut almost entirely across the bar from opposite sides so that the central portion of the bar is integrally connected to the two opposite end portions by an integral cantilever arm between the transversely overlapping portions of the two pairs of slots. This cantilever arm arrangement enables the central portion of the bar to be flexed in a longitudinal direction toward and away from the respective end portions which, in the assembly, are fixedly and rigidly mounted on a rotating face plate assembly.

A ratchet wheel driven differential screw is engaged between the face plate and central portion of the flexible member, rotation of this differential screw shifting the central portion of the member relative to its ends in a direction radially of the face plate. The ratchet wheel in turn is arranged to be driven in step-by-step rotation in either direction by a pair of opposed pawls which in turn are actuated by a piston rod-cam assembly. The piston rod is mounted coaxially within the face plate spindle and is controlled by a twin piston assembly to reciprocate the piston rod to one side or the other of a normally maintained centered rest position. A standard triple passage air joint supplies air to the piston assembly, while valving of the air to and from the three piston chambers is accomplished by a conventional remote control unit.

Other objects and features of the invention will become apparent by reference to the following specification and to the drawings.

IN THE DRAWINGS

Figure 1:
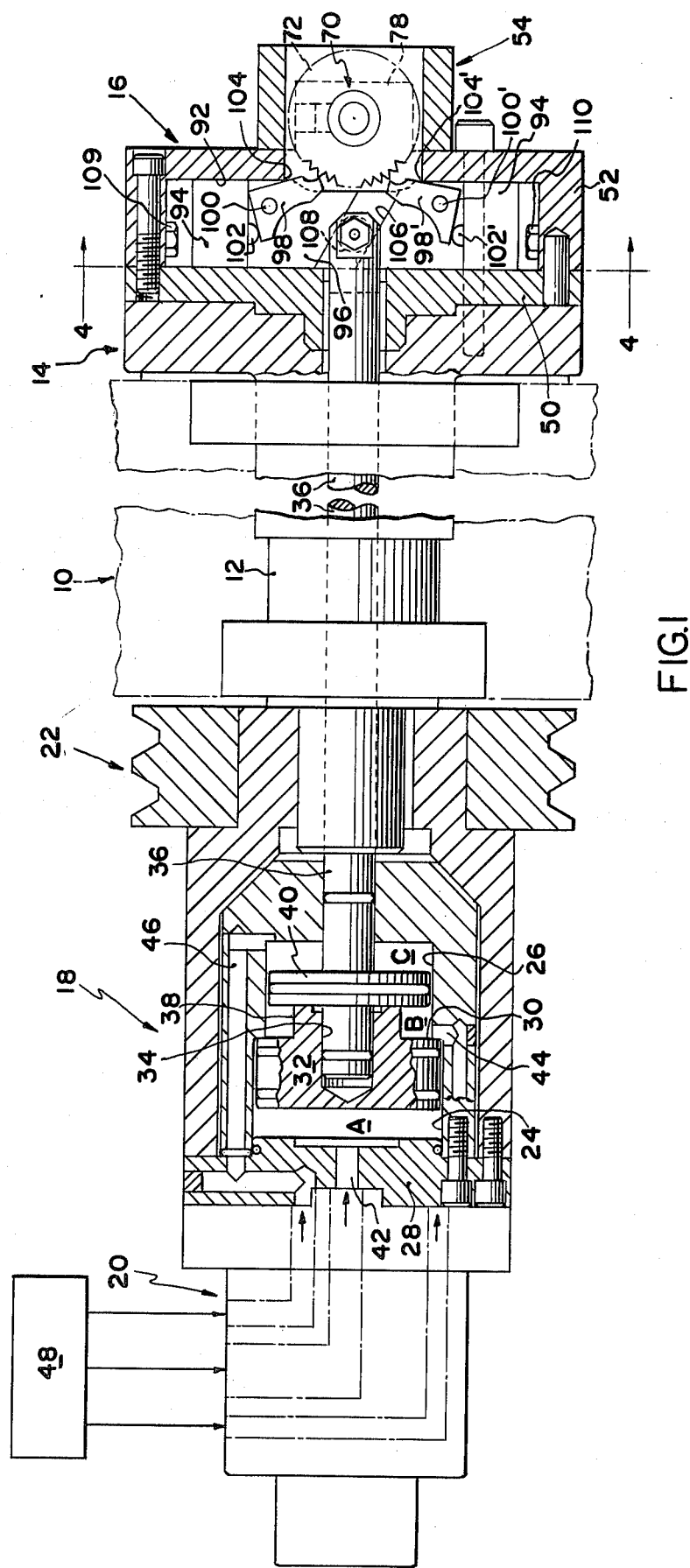
FIG. 1 is a cross sectional view of a tool positioning assembly embodying the present invention.

Referring first to FIG. 1, a portion of a stationary machine frame is designated generally 10 and rotatably supports a spindle 12 having a face plate portion 14 at its right-hand end. A tool positioning adjustment mechanism designated generally 16 is fixedly mounted upon face plate 14 by means not shown, for rotation with the face plate. At the opposite or left-hand side of machine frame 10, a piston housing designated generally 18 is fixedly mounted upon and rotatably coupled to spindle 12 and a commercially available, standard triple passage air joint 20 is in turn mounted at the left-hand end of piston housing 18. Spindle 12 may be driven in rotation within frame 10, as by a drive pulley 22.

Referring now to piston housing 18, it is seen that the piston chamber is defined by coaxial large and small diameter bores 24 and 26, respectively, the left-hand end of bore 24 being sealed closed by an endcap 28. A radial shoulder 30 defines the inner end of the large diameter bore 24 and forms a seat establishing one end limit of movement of a stop piston 32 which is slidably received within bore 24. Piston 32 is a free piston, a central bore 34 in its right-hand end as viewed in FIG. 1 slidably receives the end of a piston rod 36. A reduced diameter section 38 at the right-hand end of piston 32 is spaced radially inwardly from the wall of the small diameter bore 26. Within bore 26, a second piston 40 is mounted for sliding movement. Piston 40 is fixed to piston rod 36.

The piston arrangement described provides three separate chambers, chamber A being located between endcap 28 and piston 32, chamber B being located between piston 32 and piston 40, and chamber C being located between piston 40 and the inner end of bore 26. Passages 42, 44 and 46 respectively connect chambers A, B and C to a remote control unit schematically illustrated at 48. Control unit 48 may take the form of any of several commercially available control units, its function being to independently and selectively connect passages 42, 44 and 46 either to a source of air under pressure or to vent the respective passages. The construction and operation of appropriate control units are well known in the art and do not, per se, form any part of the present invention other than to supply air under pressure to or vent the chambers A, B, C, as desired.

Normally, control unit 48 will function to supply air under pressure to chambers A and C. This is the condition shown in FIG. 1 wherein piston 32 is held against shoulder 30 and piston 40 is held against the reduced diameter end 38 of piston 32. This condition holds piston 40 in what will be termed a neutral or centered position which in turn establishes a neutral or centered position of piston rod 36 axially of spindle 12. If chamber C is then vented and pressure applied to chamber B, piston 40 and piston rod 36 will move to the right from the FIG. 1 position. Restoration of piston 40 to the FIG. 1 position is accomplished by restoring the pressure into the chamber C while venting chamber B.

If chamber A is vented, the pressure in chamber C against the right-hand face of piston 40 will drive both piston 40 and piston 32 to the left from the FIG. 1 position. This will cause piston rod 36 to stroke to the left from the FIG. 1 position, restoration of the pistons to the original positions shown in FIG. 1 being accomplished simply by again supplying pressure to chamber A, the greater area of the face of piston 32 overcoming the opposing pressure exerted on the right-hand face of piston 40.

Figure 2:
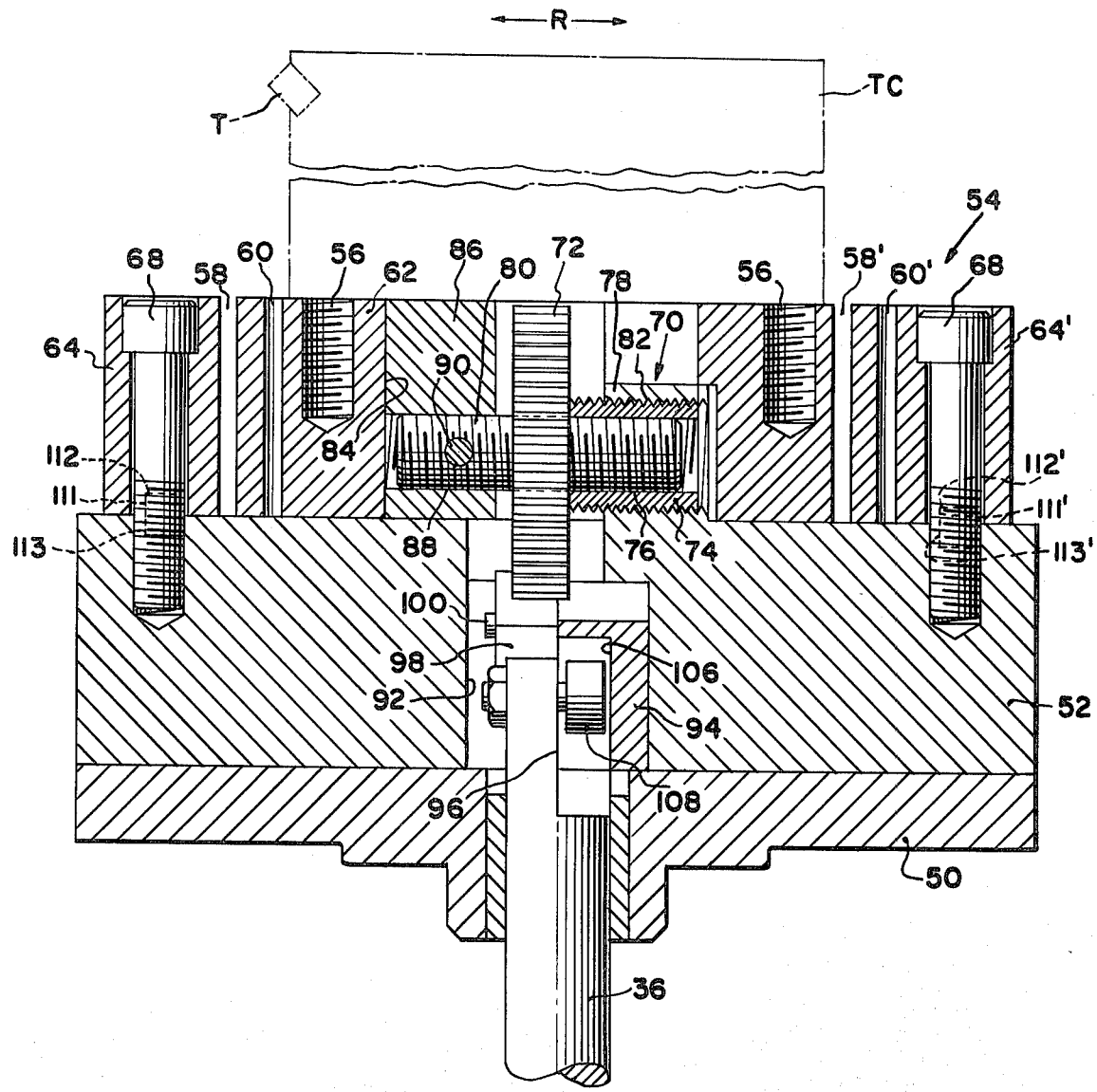
FIG. 2 is a cross sectional view, taken on the line 2—2 of FIG. 3 on a plane at right angles to the plane of the cross section of FIG. 1.
Figure 3:
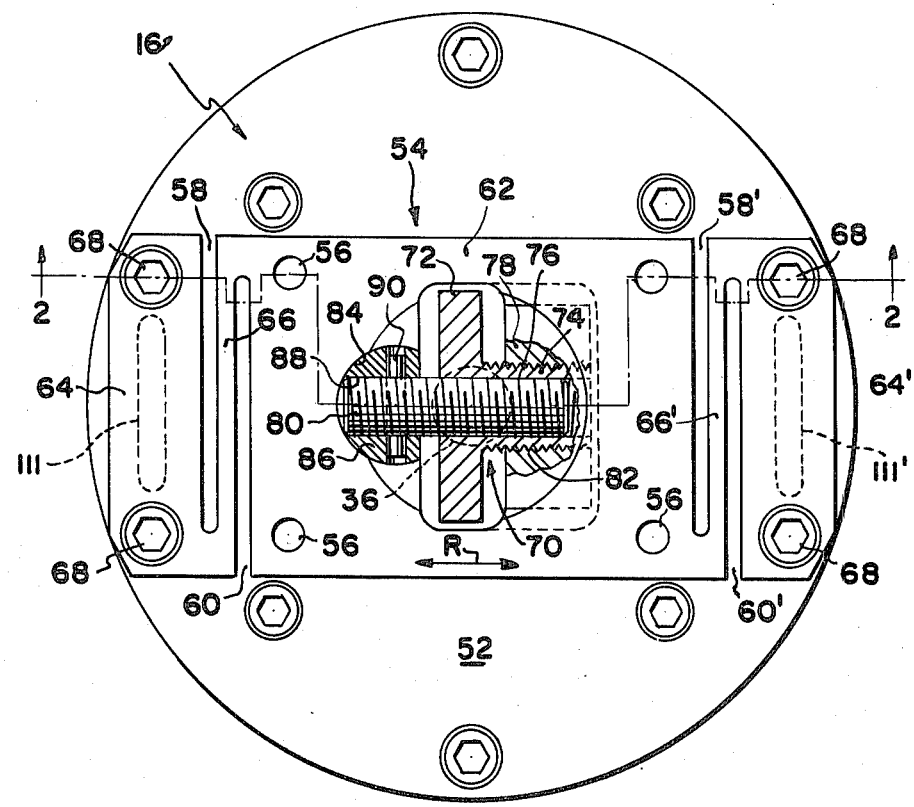
FIG. 3 is an end elevational view of the apparatus of FIGS. 1 and 2, with certain parts broken away or shown in section.

Referring now particularly to FIGS. 1, 2 and 3, the tool positioning or mounting mechanism 16 is seen as including a base plate 50, a guide plate 52 and the spring steel flexible bar designated generally 54. A tool carrier or bar TC, indicated by broken line in FIG. 2, is mounted upon bar 54 as by bolts received in openings 56, and carries a tool T. The assembly operates to adjust the position of the tool T radially of the axis of rotation of the spindle in the direction of the arrow R. The manner in which this is accomplished is described below.

Referring now particularly to FIG. 3, it is seen that bar 54 is an elongate one piece rectangular bar having oppositely directed pairs of transverse slots 58, 60, and 58', 60' cut nearly entirely through the bar from opposite sides adjacent each end of the bar. Thus, the central portion 62 of bar 54 is coupled to its opposite end portions 64, 64' respectively, by a relatively narrow transversely extending cantilever arm 66, 66'. The arms 66, 66' are capable of resilient flexing movement, and thus central portion 62 can shift in a longitudinal direction relative to end portions 64, 64' of the bar.

Bar 54 is mounted upon guide plate 52 by bolts 68 and rigidly anchored by means of keys 111 and 111' in keyways 112 and 112' in flexible bar 54 and 113 and 113' in guide plate 52 (FIGS. 2 and 3), which fixedly secure end portions 64, 64' to guide plate 52, while leaving central portion 62 of bar 54 free to shift radially of guide plate 52. Tool carrier TC (FIG. 2) is mounted upon bar 54 via bolt holes 56 which are located in the central portion 62 of the bar. Thus, shifting movement of central portion 62 may be transmitted to tool carrier TC.

Positioning of the central portion 62 of the flexible bar 54 radially relative to guide plate 52 is accomplished by a differential screw assembly designated generally 70 which includes a toothed, bi-directionally rotatable, ratchet wheel 72. Differential screw assembly 70 includes an outer screw 74 which is threadably received within a threaded bore 76 in an integral projection 78 of guide plate 52. Outer screw 74 is fixedly secured to or is integral with ratchet wheel 72, thus rotation of the ratchet wheel will thread outer screw 74 into and out of the threaded bore 76 in projection 78 on guide plate 52. An inner screw 80 is threadably received within a threaded bore 82 which extends coaxially through outer screw 74 and ratchet wheel 72.

Referring now particularly to FIG. 3, a vertical bore 84 passes downwardly through central portion 62 of bar 54, and insert 86 is snugly recieved within bore 84. Inner screw 80 is threadably received within a horizontal bore 88 through insert 86 and is locked in position within insert 86 by a cross pin 90. Thus, one end of differential screw assembly 70 is threadably engaged in guide plate 52, while the opposite end of the second screw 80 is fixedly secured to the central portion 62 of the bar 54 via insert 86.

Rotation of ratchet wheel 72 in one direction will cause the outer screw 74 to, for example, advance to the right as viewed in FIG. 3. This action, taken by itself, would tend to pull the central portion 62 of bar 54 to the right as viewed in FIG. 3, however, at the same time the outer screw 74 moves to the right, the rotation of the screw causing this right-hand movement is also applied to inner screw 80 in a direction such that inner screw 80 is moved to the left relative to outer screw 74. If both the inner and outer threads on screw 74 were the same, no net movement would be imparted to central portion 62 by rotation of the differential screw assembly 70. However, by selecting different threads for the threaded engagement at 76 and at 82, a very precise and minute shifting movement of central portion 62 for a given rotation of ratchet wheel 72 can be achieved.

For example, if the threads on the outer side of outer screw 74 are forty threads per inch and the threads on inner screw 80 are thirty-six threads per inch, one complete revolution of ratchet wheel 72 would cause the ratchet wheel and outer screw 74 to advance one-fortieth of an inch or 0.025 inches to the right as viewed in FIG. 3, while at the same time inner screw 80 would shift one-thirty-sixth of an inch to the left relative to the outer screw (0.0277 inches). The total net movement of central portion 62 of bar 54 relative to guide plate 52 induced by this complete revolution of ratchet wheel 72 would thus be the difference between 0.0277 of an inch (left) and 0.0250 of an inch (right) or a net movement of 0.0028 of an inch to the left. Thus, if ratchet wheel 72 had, let us say, fifty teeth and was advanced only one tooth, in a manner to be described below, the total displacement of central portion 62 relative to guide plate 52 for one-fiftieth of a rotation of ratchet wheel 72 would be one-fiftieth of 0.0028 inches or 0.000056 inches.

Figure 4:
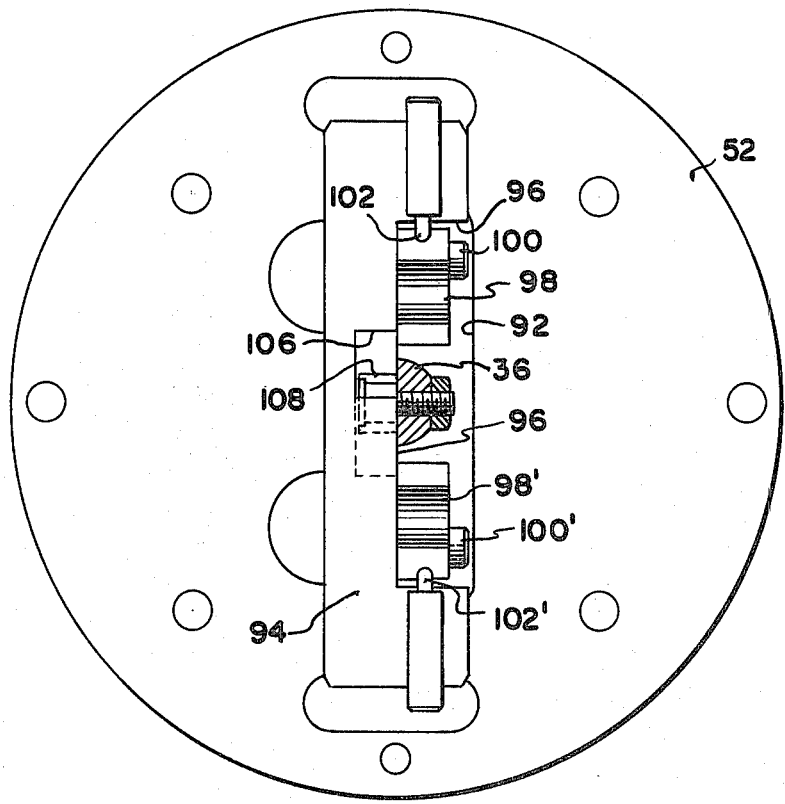
FIG. 4 is a cross sectional view taken on the line 4—4 of FIG. 1.

The pawl arrangement for rotating ratchet wheel 72 is best seen in FIGS. 1, 2, and 4. Referring particularly to FIGS. 1 and 4, the underside of guide plate 52 is formed with an elongate radially extending slot 92 within which a slide block 94 is slidably received. The central portion of slide block 94 is recessed at one side as at 96 so that a pair of pawls 98, 98' can be pivotally mounted at one side of the recess within the envelope of slide block 94. The pawls are mounted for pivotal movement as by pivot pins 100, 100', and spring pressed plungers 102, 102' resiliently bias the pawls about their respective pivot points to urge the pawls into engagement with a shoulder 104, 104' on guide plate 52. As best seen in FIG. 1, when in this position, the pawl teeth are operatively aligned, but slightly spaced from, the teeth on ratchet wheel 72.

As best seen in FIG. 1, a diagonally extending slot 106 is cut in slide block 94 and a roller 108 rotatably mounted on the end of piston rod 36 is received within slot 106. Oppositely disposed end stops 109 and 110 are provided on guide plate 52 as shown.

It is believed apparent from FIG. 1 that if piston rod 36 is moved to the right from the FIG. 1 position, the engagement of roller 108 within slot 106 will cause slide block 94 to move outwardly until it bottoms against end stop 109, as viewed in FIG. 1, as piston rod 36 moves to the right from the FIG. 1 position. Such movement of slide block 94 would carry with it the two pawls, and outward movement of the pawl 98' would advance the tooth of this pawl into engagement with a tooth of ratchet wheel 72 and continued outward movement of the pawl 98' would then drive ratchet wheel 72 in a clockwise direction as viewed in FIG. 1.

Such rotation of ratchet wheel 72 would be transmitted, as described above, via the differential screw assembly 70 to shift the central portion 62 of bar 54, and hence the tool carried upon central portion 62 a minute and precisely determined distance, the magnitude of which would depend upon the thread differential of differential screw 70 and the number of teeth on ratchet wheel 72. Similarly, if piston rod 36 is moved to the left, slide block 94 will move outwardly in the opposite direction until it bottoms against end stop 110; and in so doing, moves the central portion 62 in the opposite direction. The length of stroke of piston rod 36, determined as described above, and the inclination of slot 106 will normally be selected so that the full stroke of piston 40 in one direction or the other from the centered position shown in FIG. 1 will drive the particular pawl a distance such that the ratchet wheel will be rotatively advanced through an angular increment corresponding to one tooth spacing of the ratchet wheel.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a tool arm assembly having a rotary spindle including a face plate, and tool mounting means supported on said face plate for adjustably shifting a tool in predetermined step-by-step increments radially of said spindle while said face plate is rotating;

the improvement wherein said tool mounting means comprises a bar member supported by said face plate and extending radially of said spindle, said bar member having a pair of end portions fixedly secured to said face plate and a central portion resiliently coupled to and between said end portions for movement relative to said end portions radially of said spindle, means for fixedly mounting a tool on said central portion of said bar member, screw means operable when rotated to shift said central portion relative to said spindle, bi-directional pawl and ratchet means operable when actuated to drive said screw means in a predetermined increment of rotation, remotely controlled means for selectively actuating said pawl and ratchet means to drive said screw means through one increment of rotation in either direction while the spindle is rotating, said remotely controlled means comprising a piston rod mounted within said spindle for coaxial movement relative to said spindle, piston means coupled to said piston rod, and fluid pressure supply means for normally maintaining said piston rod in a predetermined neutral position and selectively operable to drive said piston rod in a stroke of predetermined length in either direction from said neutral position to actuate said pawl and ratchet means.

2. The invention defined in claim 1 wherein said pawl and ratchet means comprises a toothed ratchet wheel rotatively coupled to said screw means, a slide member mounted for radial movement relative to said face plate in a path normal to the axis of rotation of said ratchet wheel, a pair of spaced opposed pawls mounted on said slide member, coupling means coupling said slide member to said remotely controlled means to normally locate said slide member in a centered rest position on its path wherein said pawls are symmetrically located in adjacent spaced relationship to two spaced points on the periphery of said ratchet wheel, said coupling means being actuable by said remotely controlled means to shift said slide member in either direction from its rest position to drive one of said pawls into engagement with said ratchet wheel to drive said wheel through one increment of rotation.

3. The invention defined in claim 1 wherein said screw means is a differential screw means including first and second screws, said first screw being threadably received coaxially within said second screw, said second screw being threadably received in a first member and being drivingly coupled to said pawl and ratchet means, and said first screw being fixedly secured to a second member, first means supporting one of said members on said face plate, and second means mounting the other of said members on said central portion of said bar member.

4. The invention defined in claim 4 wherein said pawl and ratchet means comprises a toothed ratchet wheel fixed to said second screw, and said pawl and ratchet means comprises a pair of opposed pawls respectively actuable by said remotely controlled means to rotate said ratchet wheel one step in one or the opposite direction of rotation.

5. The invention defined in claim 4 wherein said pawl and ratchet means further comprises a slide member supported on said face plate for sliding movement in either direction from a normally maintained rest position along a path normal to the axis of rotation of said ratchet wheel, said pawls being pivotally mounted upon said slide member and being located in symmetrically disposed adjacent spaced relationship to the periphery of said ratchet wheel when said slide member is in said rest position, said remotely controlled means being operable to selectively drive said slide member in a stroke of a predetermined length to either side of said rest position, movement of said slide member in one direction from said rest position engaging one of said pawls with said ratchet wheel to advance said wheel one rotative increment in one direction and movement of said slide member in the opposite direction from said rest position engaging the other of said pawls with said wheel to drive said wheel one rotative increment in the opposite direction.

6. The invention defined in claim 6 including a roller rotatably mounted on the end of said rod, and means defining a cam slot in said slide member inclined to the axis of said face plate and receiving said roller.

7. In a tool arm assembly having a rotary spindle including a face plate and tool mounting means mounted on said face plate for adjustably shifting a tool in predetermined step-by-step increments radially of said spindle while said face plate is rotating;

the improvement wherein said tool mounting means comprises a resilient steel bar member supported by and rotatable with said spindle, and extending radially of said spindle, said bar member having a first portion fixedly supported on said face plate and a mount portion resiliently coupled to said first portion for movement relative to said first portion radially of said spindle, means for fixedly mounting a tool on said mount portion of said bar member, motion transmission means operable to shift said mount portion relative to said face plate, a bi-directional means operable when actuated to drive said motion transmission means a predetermined increment, said bi-directional means including a pawl and ratchet means; and remotely controlled means for selectively actuating said bi-directional means to drive said motion transmission means through one increment in either direction while the spindle is rotating; said motion transmission means including differential screw means operable when actuated to shift said mount portion relative to said first portion and comprising a first screw means connected to said bi-directional means to be actuated thereby and a second screw means having threads of a different number per inch than said first screw means connected to be actuated by said first screw means and to actuate said mount portion.

8. The invention defined in claim 7 wherein said remotely controlled means comprises a piston rod mounted within said spindle for coaxial movement relative to said spindle, piston means coupled to said piston rod, and fluid pressure supply means for normally maintaining said piston rod in a predetermined neutral position and selectively operable to drive said piston rod in a stroke of predetermined length in either direction from said neutral position to actuate said bi-directional means.

* * * * *